United States Patent [19]
Nishimoto

[11] Patent Number: 5,810,344
[45] Date of Patent: Sep. 22, 1998

[54] CLAMPING APPARATUS

[75] Inventor: Toshinao Nishimoto, Kobe, Japan

[73] Assignee: Kabushiki Kaisha Kosmek, Hyogo, Japan

[21] Appl. No.: 839,105

[22] Filed: Apr. 23, 1997

[30] Foreign Application Priority Data

Apr. 23, 1996 [JP] Japan .................................. 8-100596

[51] Int. Cl.[6] .................................................. B23Q 3/02
[52] U.S. Cl. ............................................................ 269/309
[58] Field of Search ................................... 269/309, 310, 269/56, 900, 32; 29/33 P, 48.5 A, 559, 464, 563; 198/345; 409/903

[56] References Cited

U.S. PATENT DOCUMENTS

| | | |
|---|---|---|
| 4,830,349 | 5/1989 | Miyata . |
| 4,932,642 | 6/1990 | Salenbien et al. ...................... 269/309 |
| 4,948,105 | 8/1990 | Yonezawa . |
| 4,989,630 | 2/1991 | Yonezawa . |
| 5,190,272 | 3/1993 | Zika et al. ............................... 269/309 |
| 5,370,378 | 12/1994 | Weber et al. ........................... 269/309 |
| 5,415,384 | 5/1995 | Obrist et al. ........................... 269/309 |
| 5,462,084 | 10/1995 | Arisato . |

*Primary Examiner*—Robert C. Watson
*Attorney, Agent, or Firm*—Bacon & Thomas, PLLC

[57] ABSTRACT

An annular piston (20) is inserted into a lower portion of a guide bore (17) of a housing (11), and a transmission sleeve (24) is inserted into the cylindrical bore (20a) of the piston (20) with a first annular gap (21) defined therebetween. A ring-shaped operation member (36) is inserted into an upper portion of the guide bore (17) with a second annular gap (22) defined therebetween. At the time of clamping, first a pull bolt (3) is inserted into the sleeve (24) and then the sleeve (24) is driven downward by the piston (20). Thereupon, balls (37) are changed over to an engagement position (X) by the operation member (36), so that a driving force of the piston (20) can be transmitted to a workpiece (1) through the sleeve (24), the balls (37) and the pull bolt (3).

7 Claims, 4 Drawing Sheets

CLAMPING APPARATUS

BACKGROUND OF THE INVENTION

1. Field of the Invention

The present invention relates to a clamping apparatus adapted to clamp an object to be clamped (referred to as a clamped object hereinafter), such as a workpiece and a metal mold onto a work pallet or a table.

2. Description of Prior Art

For example, when the clamped object is a workpiece, generally a clamping apparatus of swing arm type is used for detachably clamping the workpiece onto a work pallet.

When explaining it more in detail, a plurality of clamp housings are fixedly secured to the work pallet at positions near to opposed left and right side surfaces of the workpiece and an arm is swingably supported by each housing. When one swinging portion of the arm is driven upward by a hydraulic piston, the other swinging portion of the arm is swung downward to push the workpiece onto the work pallet.

However, the following problems were caused by the above-mentioned conventional clamping apparatus.

In the clamping condition, the workpiece having six, namely front, rear, upper, lower, left and right surfaces is supported at its lower surface by the work pallet with its opposed left and right surfaces faced to the housing of the clamping apparatus and its upper surface contacted with the arm at a plurality of locations. Therefore, it is impossible to machine the left and right opposed surfaces of the workpiece at a plurality of locations and its upper surface at the plurality of locations in the above-mentioned clamping condition with the workpiece supported at its lower surface because a tool interferes therewith.

In case that the clamped object is a lower metal mold, since spaces on the opposed sides of the metal mold and a portion of an upper space thereof are narrowed by the housing and the plurality of arms, a workability becomes worse at the time of exchanging metal molds.

SUMMARY OF THE INVENTION

An object of this invention is to enable a clamped object such as a workpiece to be clamped so as to provide working spaces for its five surfaces and to enable such clamping to be smoothly carried out.

For accomplishing the above-mentioned object, the invention of claim 1 is constructed as follows, for example as shown in FIGS. 1, 4 and 5.

An annular driving member 20 is axially movably inserted into a second end side portion of a guide bore 17 opened at a first end of a housing 11, and a transmission sleeve 24 is inserted into a cylindrical bore 20a of the driving member 20 with a first annular gap 21 defined between them. The transmission sleeve 24 is adapted to be movable to the second end by the driving member 20 and to be movable to the first end by a return means 31. An operation member 36 is inserted into a first end portion of the guide bore 17 with a second annular gap 22 defined between them. An engagement member 37 supported by the first end portion of the transmission sleeve 24 is adapted to be changed over between an engagement position X where it engages with an engaging portion 5 of a rod 3 inserted into a cylindrical bore 24b of the transmission sleeve 24 and an engagement cancelling position Y where it disengages from the engaging portion 5, by the axial movement of the transmission sleeve 24 to the operation member 36.

The invention of claim 1 functions exemplarily as follows.

As shown in FIG. 4, when the rod 3 fixedly secured to the clamped object 1 starts to be inserted into the housing 11 of the clamping apparatus 10, the clamping apparatus 10 is operated into the clamp cancelling condition. That is, the transmission sleeve 24 is moved upward, namely toward the first end side by the return means 31, so that the engagement member 37 is changed over to the engagement cancelling position Y.

When the clamped object 1 is lowered from the condition illustrated in FIG. 4, first the lower end of the rod 3 is inserted into the cylindrical bore 24b of the transmission sleeve 24. In case that the axis A of the guide bore 17 is offset relative to the axis B of the rod 3 at the commencement of inserting the rod 3, the offset is corrected automatically by relative horizontal movement of the transmission sleeve 24 and the operation member 36 owing to the existence of the two annular gaps 21, 22.

Accordingly, as shown in FIG. 5, the rod 3 can be inserted smoothly into the cylindrical bore 24b of the transmission sleeve 24 and the clamp surface R of the clamped object 1 can be received by the support surface S of a base 7.

Next, the transmission sleeve 24 is moved downward, namely toward the second end side by the driving member 20. Thereupon, as shown in FIG. 1, the engagement member 37 supported by the transmission sleeve 24 is changed over to the engagement position X to engage with the engaging portion 5 of the rod 3. Thereby, a driving force of the driving member 20 is transmitted to the clamped object 1 through the transmission sleeve 24, the engagement member 37 and the rod 3 in order, so that the clamp surface R of the clamped object 1 can be fixedly secured to a support surface S of the base 7.

When cancelling the clamping condition illustrated in FIG. 1, since it becomes possible to change over the engagement member 37 to the engagement cancelling position Y by moving the transmission sleeve 24 upward by the return means 31, the rod 3 can be taken out smoothly by moving the clamped object 1 upward in this condition.

Accordingly, the invention of claim 1 can present the following advantages.

In the clamping condition, it is possible to provide working spaces for the five surfaces, except the clamp surface R, of the six ones of the clamped object 1. Therefore, in the case that the clamped object is the workpiece, its five surfaces can be machined continuously in the clamping condition, so that a machining efficiency can be improved enormously. In the case that the clamped object is the metal mold, since a surrounding space around the metal mold is not narrowed, a workability at the time of the metal mold exchanging can be improved.

Further, as mentioned above, even when. the axis of the guide bore of the clamping apparatus and the axis of the rod of the clamped object are offset, since the offset condition can be corrected automatically, connection working at the time of the clamping can be carried out smoothly.

In addition, since the engagement member is supported by the first end portion of the transmission sleeve, the engagement member and the engaging portion of the rod can be engaged with each other at a shallow position of the guide bore. Therefore, a projecting length of the rod from the clamped object becomes shorter.

BRIEF DESCRIPTION OF THE DRAWINGS

FIG. 1 shows a clamping condition of the clamp apparatus and is a vertical sectional view of a portion I indicated by an arrow in FIG. 3;

FIG. 2 is an elevation view of a workpiece to be clamped by the apparatus;

FIG. 3 is an elevation view showing such a condition that the workpiece is clamped by the apparatus;

FIG. 4 is a vertical sectional view showing such a condition that a rod fixedly secured to the workpiece starts to be inserted into a housing of the apparatus; and FIG. 5 shows a clamping cancelling condition of the apparatus and is a view corresponding to FIG. 1.

DESCRIPTION OF THE PREFERRED EMBODIMENTS

One embodiment of a clamping apparatus according to the present invention will be explained hereinafter with reference to FIGS. 1 to 5. First, procedures for clamping a clamped object by the clamping apparatus will be explained with reference to FIGS. 2 to 4.

Figure 2:
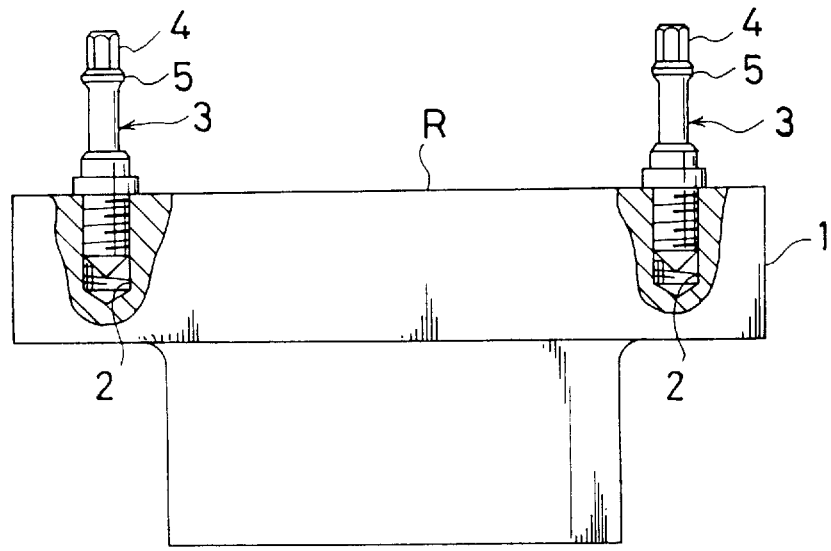

In FIG. 2, the numeral 1 designates a workpiece (an object to be clamped) which is about to be machined by a machining center and has six surfaces, namely front, rear, upper, lower, left and right surfaces. The upper one of those six surfaces of the workpiece 1 is previously machined and finished as a reference surface (a clamp surface) R. Then, a plurality of internally threaded bores 2 are formed in the reference surface R. After that, a pull bolt (rod) 3 is detachably secured to each internally threaded bore 2 by hand or a robot. The pull bolt 3 is provided at its leading end with a hexagonal screw-driving portion 4 and an engaging portion 5 described later.

Figure 3:
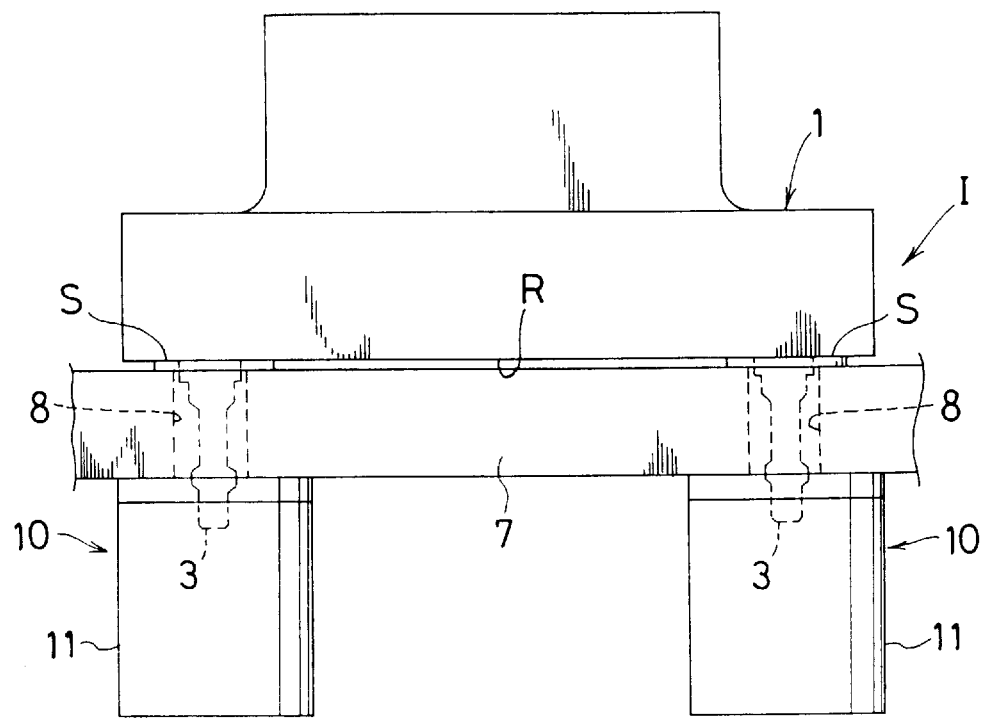

In FIG. 3, the numeral 7 designates a work pallet as a base for supporting the clamped object. A plurality of through holes 8 (only two holes of which are illustrated here) described later are formed in the work pallet 7, and a housing 11 of the clamping apparatus 10 is fixedly secured to the pallet 7 at a position corresponding to a lower opening of the through hole 8. A support surface S is formed by a peripheral edge portion of an upper opening of the through hole 8.

By the way, the through hole 8 and the support surface S may be formed in an adapter block (not illustrated) attached to the work pallet 7, instead of those directly formed in the work pallet 7. In this case, it is preferable to fix the housing 11 to the adapter block.

Figure 4:
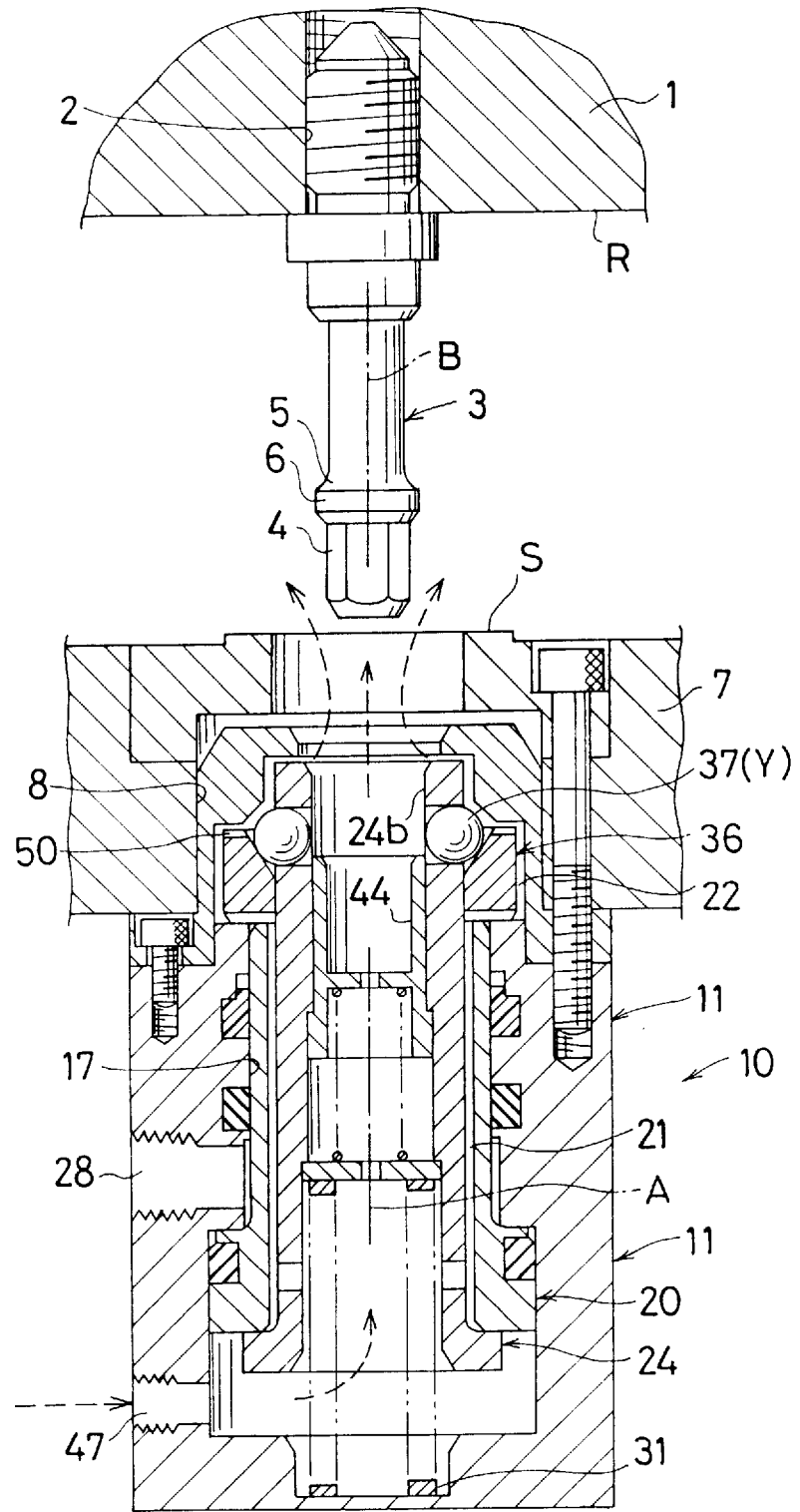

When fixing the workpiece 1 to the pallet 7, as shown in FIG. 3, first the workpiece 1 having a posture illustrated in FIG. 2 is reversed vertically so as to have a posture illustrated in FIG. 4. Then the pull bolts 3, 3 are inserted into the through holes 8, 8 of the pallets 7 in that reversed condition and the reference surface R of the workpiece 1 is received by the support surface S of the pallet 7. Next, the clamping apparatus 10 is driven for clamping. Thereupon, the pull bolts 3, 3 are pulled downward by a clamping mechanism disposed within the housing 11 and described later, so that the workpiece 1 can be clamped to the support surface S. Subsequently, the pallet 7 is brought into the machining center and then the five surfaces, except the reference surface R, of the six ones of the workpiece 1 are machined continuously by the machining center.

When the machining is completed, first the work pallet 7 is brought out of the machining center, then the above-mentioned clamping condition is cancelled to release the workpiece 1 from the pallet 7. After that, the pull bolts 3, 3 are removed from the workpiece 1.

Figure 1:
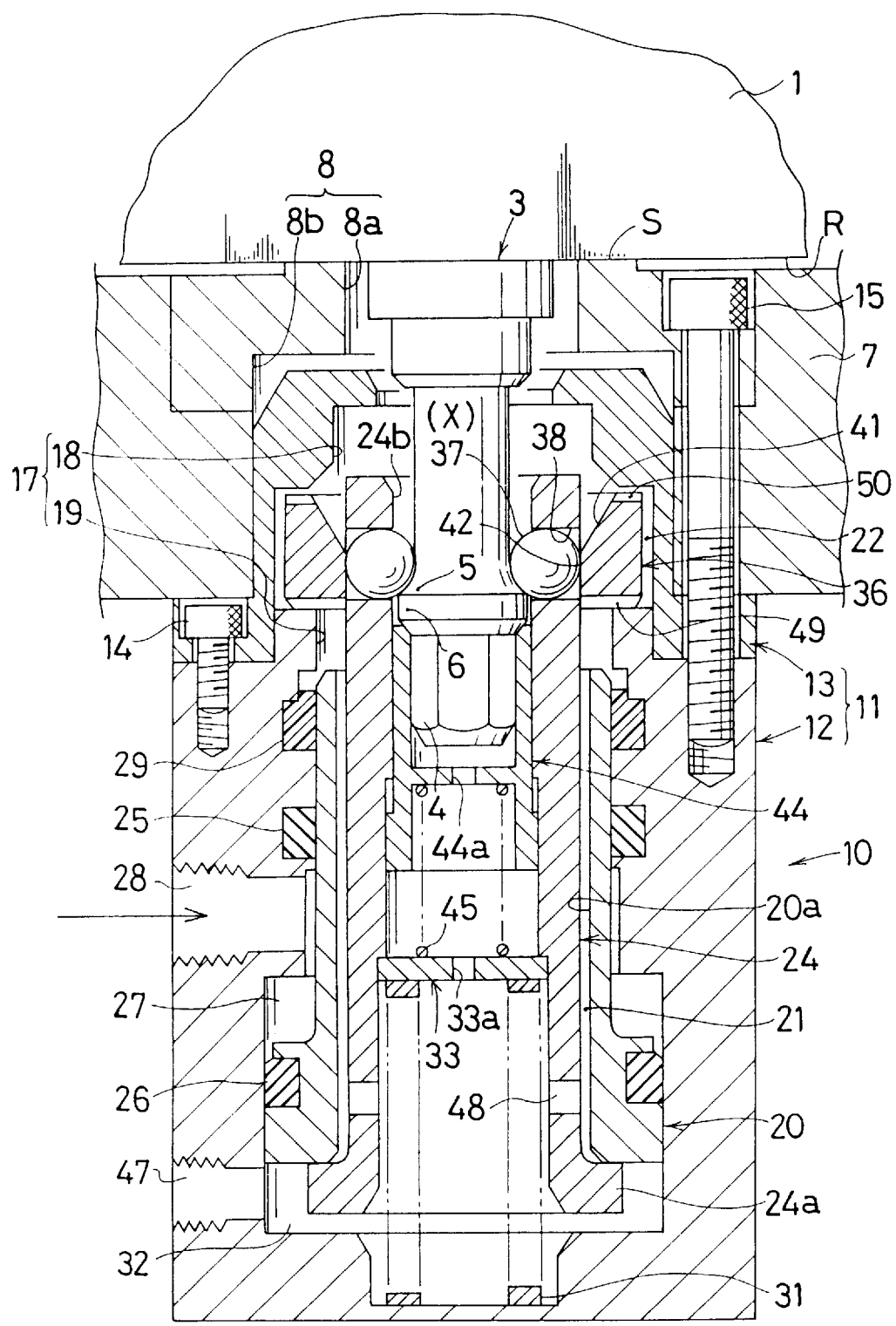
FIGS. 1 to 5 show one embodiment of a clamping apparatus of the present invention.
Figure 5:
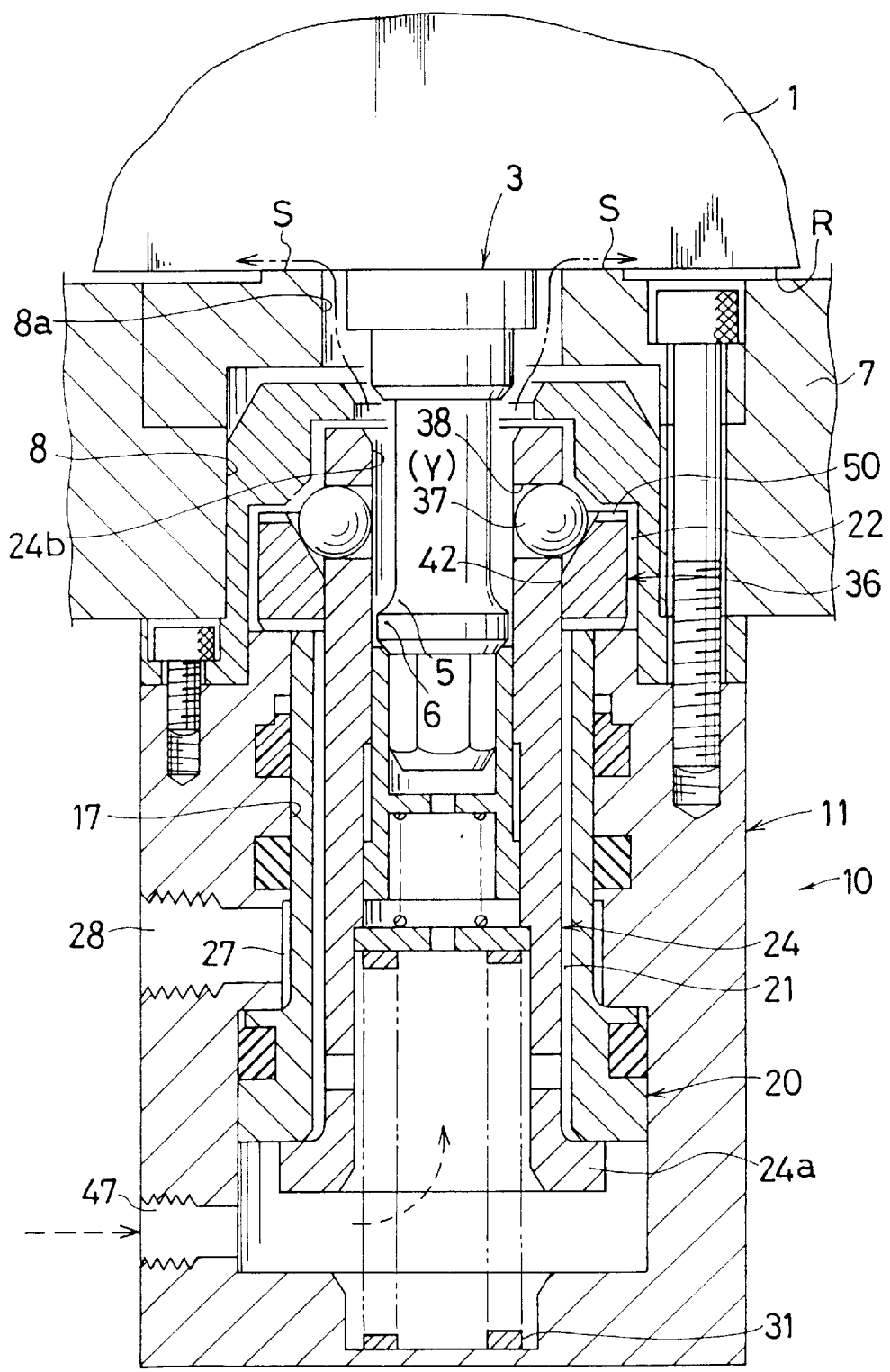

Next, a construction of the clamping apparatus 10 will be explained in detail with reference to FIGS. 1 and 5. FIG. 1 shows the clamping condition and is a vertical sectional view of a portion indicated by an arrow I in FIG. 3. FIG. 5 shows the clamping cancelling condition and is a view corresponding to FIG. 1.

As shown mainly in FIG. 1, the through hole 8 of the work pallet 7 comprises an upper hole 8a having a small diameter and a lower hole 8b having a large diameter. The housing 11 of the clamping apparatus 10 comprises a lower housing portion 12 and an upper housing portion 13 adapted to be fitted into the lower hole 8b. These upper and lower housing portions 12, 13 are combined integrally by a plurality of short bolts 14 and fixedly secured to the work pallet 7 by a plurality of long bolts 15. Incidentally, merely one of each of the bolts 14, 15 is illustrated.

A guide bore 17 is formed in the housing 11 so as to extend vertically. The guide bore 17 comprises an upper bore 18 formed in the upper housing portion 13 and a lower bore 19 formed in the lower housing portion 12, and an upper end (a first end) of the upper bore 18 is opened upward. By the way, the symbol A in FIG. 4 designates an axis of the guide bore 17, and the symbol B in FIG. 4 designates an axis of the pull bolt 3.

A piston 20, an annular driving member is inserted into the lower bore 19 of the guide bore 17 so as to be movable hermetically in the axial direction. A transmission sleeve 24 is inserted into a cylindrical bore 20a of the piston 20 with a first annular gap 21 defined therebetween. A hydraulic actuation chamber 27 is formed between an upper and a lower O-rings 25, 26 above the piston 20. The numeral 28 designates a pressurized oil supply/discharge port, and the numeral 29 does a dust seal. When a pressurized oil is supplied to the actuation chamber 27, the transmission sleeve 24 is moved downward by the piston 20 through a flange 24a. To the contrary, when the pressurized oil is discharged from the actuation chamber 27, the transmission sleeve 24 and the piston 20 are moved upward by a return spring (a return means) 31. The numeral 32 designates a spring chamber, and the numeral 33 does a spring retainer.

A ring-shaped operation member 36 is inserted into a lower side portion of the upper bore 18 of the guide bore 17 with a second annular gap 22 defined therebetween, and the operation member 36 is externally fitted to a plurality of balls (engagement members) 37 supported by the upper portion of the transmission sleeve 24. When explaining it more in detail, a plurality of communication holes 38 are formed through an upper end portion (a first end portion) of the transmission sleeve 24 so as to be spaced apart in the circumferential direction, and the ball 37 is inserted into each communication hole 38 so as to be able to advance and retreat horizontally. A tapered first surface 41 and a second surface 42 continuing from this surface 41 are formed in an inner peripheral surface of the operation member 36 in vertical arrangement.

A cylindrical guide member 44 is fitted into the transmission sleeve 24, and the guide member 44 is urged upward by an adjusting spring 45.

Further, a cleaning fluid supply port 47 is formed in a lower portion of the lower housing portion 12. The supply port 47 is communicated with an upper end of the upper hole 8a of the pallet 7 through the spring chamber 32, a through hole 48 of the transmission sleeve 24, the first annular gap 21, a lower groove 49 of the operation member 36, the second annular gap 22, an upper groove 50 of the operation member 36 and an upper end of the guide bore 17 in order as well as communicated with the upper end of the upper hole 8a of the pallet 7 through the spring chamber 32, a through hole 33a of the spring retainer 33, a through hole 44a of the guide member 44 and the upper end of the guide bore 17 (refer to FIG. 4).

An operation of the clamping apparatus 10 having the above-mentioned construction will be explained hereinafter with reference to FIGS. 4 and 5 and FIG. 1.

As shown in FIG. 4, when the pull bolt 3 fixedly secured to the workpiece 1 starts to be inserted into the housing 11, the clamping apparatus 10 has been operated to take the clamping cancelling condition. That is, when the pressurized oil is discharged from the supply/discharge port 28, the transmission sleeve 24 is moved upward by the return spring 31 so that the plurality of balls 37 can be changed over to the engagement cancelling position Y remote from the axis A.

Further, as shown in FIG. 4, a cleaning compressed air is supplied to the supply port 47 and the compressed air is discharged from the upper end of the guide bore 17 through the above-mentioned routes (refer to arrows depicted by broken lines). Therefore, foreign materials such as dusts and chips attaching to a lower portion of the pull bolt 3 are blown off by the discharged compressed air to clean the pull bolt 3.

When the workpiece 1 is lowered from the condition illustrated in FIG. 4, first the screw-driving portion 4 formed at a lower end of the pull bolt 3 is fitted into the guide member 44 and then a flange portion 6 of the engaging portion 5 pushes the guide member 44 downward. In case that the axis A of the guide bore 17 and the axis B of the pull bolt 3 are offset at the beginning of the insertion of the pull bolt 3, the transmission sleeve 24 and the operation member 36 move horizontally owing to the existence of the two annular gaps 21, 22 so that the offset condition can be corrected automatically.

Thereby, as shown in FIG. 5, the pull bolt 3 can be inserted smoothly into the cylindrical bore 24b of the transmission sleeve 24 and the reference surface R of the workpiece 1 can be received by the support surface S of the pallet 7.

During the insertion of the pull bolt 3, since a gap between the upper hole 8a of the pallet 7 and an outer peripheral surface of the pull bolt 3 and a gap between the cylindrical bore 24b of the transmission sleeve 24 and the outer peripheral surface of the pull bolt 3 are narrowed, the compressed air flows vigorously through those gaps to clean the outer peripheral surface of the pull bolt 3 sufficiently. Thereupon, the engaging portion 5 is cleaned completely by the compressed air discharged in the centripetal direction from the upper groove 50 of the operation member 36. Therefore, it becomes possible to prevent an engagement error from occurring between the engaging portion 5 and the ball 37 at the time of engagement described later.

Further, just before the reference surface R of the workpiece 1 is received by the support surface S of the pallet 7, since a gap between both these surfaces R and S is narrowed so that the compressed air flows vigorously through the gap (refer to arrows depicted by alternate long and two short dashes lines in FIG. 5), both the surfaces R and S can be cleaned completely by the compressed air. Therefore, the workpiece 1 can be positioned accurately with respect to the pallet 7. Additionally, since the second annular gap 22 serves also as a passage for the cleaning compressed air, a construction of the cleaning mechanism can be simplified by omitting at least a portion of the cleaning passage.

Subsequently, a pressurized oil is supplied to the actuation chamber 27 to drive the transmission sleeve 24 downward by the piston 20 against the return spring 31. Thereupon, as shown in FIG. 1, the balls 37 inserted into the communication holes 38 of the transmission sleeve 24 are pushed toward the axis A by the first surface 41 of the operation member 36 to be changed over to the engagement position X and to be locked at the engagement position X by the second surface 42.

Thereby, a driving force of the piston 20 is transmitted to the workpiece 1 through the transmission sleeve 24, the balls 37 and the pull bolt 3 in order, so that the workpiece 1 can be clamped to the pallet 7.

During the clamp driving, since the center of the ball 37 is located within the communication hole 38 of the transmission sleeve 24, the ball 37 can be driven strongly toward the axis of the guide bore 17. Therefore, a clamping force transmitted from the piston 20 to the transmission sleeve 24 can be transmitted strongly and surely to the pull bolt 3 through the balls 37.

When cancelling the clamping condition of the clamping apparatus 10 illustrated in FIG. 1, it is enough to discharge the pressurized oil from the actuation chamber 27. Thereupon, as shown in FIG. 5, the transmission sleeve 24 and the piston 20 are moved upward by the return spring 31, the locking condition held by the second surface 42 of the operation member 36 is cancelled, and the balls 37 become free (incidentally, herein there is shown a condition where the balls 37 have been already moved in the centrifugal direction and changed over to the engagement cancelling position Y). After that, the workpiece 1 is moved upward. Thereupon, since the engaging portion 5 and the flange portion 6 of the pull bolt 3 retreat the plurality of balls 37 to the engagement cancelling position Y, the pull bolt 3 can be taken out smoothly.

The above-mentioned embodiment can be modified exemplarily as follows.

Instead of the pressurized oil, other kinds of liquid or a gas such as air may be used as the pressurized fluid for driving the piston 20.

The piston 20 can be constructed so that it is driven by a spring and returned through fluid pressure instead of being driven through fluid pressure and returned by spring. Further, it may be of double acting type. The means for returning the piston 20 may employ a pressurized fluid instead of the return spring 31.

The housing 11 may be constructed integrally instead of being constructed by the upper and the lower housing portions 12, 13.

The engagement member to be engaged with the engaging portion 5 of the pull bolt 3 may employ other kinds of engaging members such as a swingable cam instead of the ball 37 and also may be constructed from a single ball instead of plural balls.

The through hole 44a of the cylindrical guide member 44 and the through hole 33a of the spring retainer 33 may be omitted. In this case, the cleaning compressed air supplied to the supply port 47 flows through the first annular gap 21 and the second annular gap 22 orderly to be discharged more vigorously from the upper groove 50 of the operation member 36 in the centripetal direction. The supply port 47 may be opened in the guide bore 17 while passing between the dust seal 29 and the O-ring 25 and may be opened directly in the second annular gap 22. Alternatively, it may be opened in a portion near to the upper end of the upper bore 18 of the guide bore 17.

Further, the cylindrical guide member 44 and the spring retainer 33 may be also omitted.

Instead of the compressed air, the cleaning fluid may be other kinds of gases such as nitrogen gas or may be a liquid.

Instead of threadably engagable bolt 3, the rod provided for the workpiece 1 may be of such a type as to be attached and detached by other means such as a retaining ring.

Instead of the workpiece 1, other kinds of objects such as a metal mold may be used as the object to be clamped by the clamping apparatus. In this case, the rod may be always attached to the clamped object or may be formed integrally with the clamped object. In these cases, the base is constructed by a table or an attachment jig for a processing machine.

The clamped object such as the workpiece 1 may be directly received by the housing 11.

The clamped object may be clamped by a single clamping apparatus instead of being clamped by plural clamping apparatuses.

The connecting or disconnecting direction between the clamped object and the clamping apparatus may be horizontal or inclined instead of vertical.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A clamping apparatus comprising:

a housing (11) having a first end and a second end;

a guide bore (17) having an axis (A) and being opened at the first end of the housing (11);

a driving member (20) having a cylindrical bore (20*a*) and adapted to be inserted into a second end side portion of the guide bore (17) and to be moved along the axis (A);

a transmission sleeve (24) adapted to be inserted into the cylindrical bore (20*a*) and to be moved to the second end by the driving member (20), into which sleeve (24) a rod (3) having an engaging portion (5) is inserted;

a return means (31) for moving the transmission sleeve (24) to the first end;

an operation member (36) adapted to be inserted into a first end portion of the guide bore (17);

a first annular gap (21) defined between the cylindrical bore (20*a*) and the transmission sleeve (24);

a second annular gap (22) defined between the guide bore (17) and the operation member (36); and an engagement member (37) supported by the first end portion of the transmission sleeve (24), the engagement member (37) being adapted to be changed over between an engagement position (X) where it engages with the engaging portion (5) and an engagement cancelling position (Y) where it disengages from the engaging portion (5), by the movement of the transmission sleeve (24) along the axis (A) with respect to the operation member (36).

2. An apparatus as set forth in claim 1, wherein a cleaning fluid supply port (47) is formed in the housing (11), and the supply port (47) is communicated with the first end of the guide bore (17) through at least the second annular gap (22).

3. An apparatus as set forth in claim 1, wherein a plurality of communication holes (38) are formed through the first end portion of the transmission sleeve (24) so as to be spaced apart in the circumferential direction, the engagement member comprising a plurality of balls (37) adapted to be inserted into the communication holes (38), the operation member (36) being formed like a ring so as to be externally fitted to the first end portion of the transmission sleeve (24), the inner peripheral surface of the ring-shaped operation member (36) being formed with a first surface (41) for guiding the plurality of balls (37) to the engagement position (X) where they get near to the axis (A) of the guide bore (17) and to the engagement cancelling position (Y) where they get away from the axis (A) and with a second surface (42) for holding the plurality of balls (37) at the engagement position (X).

4. An apparatus as set forth in claim 1, wherein the rod (3) is detachably secured to a clamp surface (R) of a workpiece (1), and the clamp surface (R) is secured to a support surface (S) of a base (7) to which the housing (11) is attached, while being pulled by the rod (3).

5. An apparatus as set forth in claim 2, wherein a plurality of communication holes (38) are formed through the first end portion of the transmission sleeve (24) so as to be spaced apart in the circumferential direction, the engagement member comprising a plurality of balls (37) adapted to be inserted into the communication holes (38), the operation member (36) being formed like a ring so as to be externally fitted to the first end portion of the transmission sleeve (24), the inner peripheral surface of the ring-shaped operation member (36) being formed with a first surface (41) for guiding the plurality of balls (37) to the engagement position (X) where they get near to the axis (A) of the guide bore (17) and to the engagement cancelling position (Y) where they get away from the axis (A) and with a second surface (42) for holding the plurality of balls (37) at the engagement position (X).

6. An apparatus as set forth in claim 2, wherein the rod (3) is detachably secured to a clamp surface (R) of a workpiece (1), and the clamp surface (R) is secured to a support surface (S) of a base (7) to which the housing (11) is attached, while being pulled by the rod (3).

7. An apparatus as set forth in claim 3, wherein the rod (3) is detachably secured to a clamp surface (R) of a workpiece (1), and the clamp surface (R) is secured to a support surface (S) of a base (7) to which the housing (11) is attached, while being pulled by the rod (3).

* * * * *